United States Patent [19]
Morrison

[11] Patent Number: 5,888,418
[45] Date of Patent: Mar. 30, 1999

[54] AZEOTROPIC REFRIGERANT COMPRISING BIS-(DIFLUOROMETHYL) ETHER AND 1,1,2-TRIFLUOROETHANE

[75] Inventor: Graham Morrison, Germantown, Md.

[73] Assignee: The United States of America as represented by the Secretary of Commerce, Washington, D.C.

[21] Appl. No.: 855,082

[22] Filed: Mar. 20, 1992

[51] Int. Cl.[6] ............................... C09K 5/04; C11D 7/30; C11D 7/26

[52] U.S. Cl. ........................... 252/67; 510/177; 510/411; 62/114

[58] Field of Search .............................. 252/67, 171, 305, 252/DIG. 9; 62/114, 324.1; 510/177, 411

[56] References Cited

U.S. PATENT DOCUMENTS

| | | | |
|---|---|---|---|
| 2,066,905 | 1/1937 | Booth | 260/151 |
| 3,362,180 | 1/1968 | Eiseman, Jr. | 62/112 |
| 3,922,228 | 11/1975 | Hutchinson | 252/67 |
| 4,041,148 | 8/1977 | Simons et al. | 424/45 |
| 4,139,607 | 2/1979 | Simons et al. | 424/45 |
| 4,541,943 | 9/1985 | Powell | 252/67 |
| 4,810,402 | 3/1989 | Bivens et al. | 252/67 |
| 4,948,526 | 8/1990 | Fellows et al. | 252/67 |
| 4,961,321 | 10/1990 | O'Neill et al. | 252/67 |
| 4,994,202 | 2/1991 | Merchant | 252/172 |

FOREIGN PATENT DOCUMENTS

| | | |
|---|---|---|
| 416777 | 3/1991 | European Pat. Off. . |
| 450855 | 10/1991 | European Pat. Off. . |

OTHER PUBLICATIONS

*Research Disclosure* vol. 146 disclosure No. 14623 "Hydrogen–containing chlorofluorocarbons" disclosed by E.I. du Pont de Nemours & Co. Jun. 1976 pp. 13–14.

Haggin, Joseph "Pressure to Market CFC Substitutes Challenges Chemical Industry" *C&EN* Sep. 9, 1991 pp. 27–28.

Morrison et al NBS Technical Note 1226 "Application of a Hard Sphere Equation of State to Refrigerants and Refrigerant Mixtures" pp. v, x, xi, 1–16.

Morrison, Graham, et al., "Azeotropy in refrigerant mixtures", Rev. Int. Froid, 16(2), 129–138. (Month not known.), 1993.

Defibaugh, D.R., et al., "Thermodynamic properties of CHF2–O–CHF2, bis(difluoromethyl)ether", Fluid Phase Equilibria, 8, 285–305. (Month is unknown.), 1992.

*Primary Examiner*—Douglas J. McGinty
*Attorney, Agent, or Firm*—Michael de Angeli

[57] ABSTRACT

An azeotropic refrigerant particularly useful as a working fluid in chilled water refrigerating systems to be used in possible juxtaposition to sea water comprises at least about 2 mol percent 1,1,2-trifluoroethane (R143) and the balance bis-(difluoromethyl) ether (E134).

2 Claims, No Drawings

AZEOTROPIC REFRIGERANT COMPRISING BIS-(DIFLUOROMETHYL) ETHER AND 1,1,2-TRIFLUOROETHANE

FIELD OF THE INVENTION

This invention relates to an azeotropic mixture for use as a refrigerant. More particularly, the invention relates to an azeotropic refrigerant composition specifically suited for use in water chiller equipment for use in maritime applications, that is, where the possibility exists of exposure to sea water.

BACKGROUND OF THE INVENTION

Fluorocarbon-based refrigerants have found widespread use in industry as working fluids for refrigeration, air conditioning and heat pump applications.

Vapor compression is one form of refrigeration. In its simplest form, vapor compression refrigeration involves repetitively vaporizing a liquid refrigerant through absorption of heat at a low pressure and temperature and recondensing the vapor to the liquid phase though heat removal at elevated pressure and temperature. The liquid refrigerant is first vaporized in an evaporator in thermal contact with the mass to be cooled. Heat flowing from the mass to the refrigerant vaporizes the refrigerant. The vapor formed is then removed by means of a compressor, in order to maintain the low pressure in the evaporator. Mechanical energy imparted by the compressor raises the temperature and pressure of the vapor. The high pressure vapor then passes to a condenser for heat exchange with a cooler medium. The cooler medium removes the sensible and latent heats from the vapor thereby condensing the vapor. The liquid refrigerant then passes to an expansion valve and thence to the evaporator for repetition of the cycle.

The choice of the working fluid for any refrigeration system is based on a number of engineering criteria. Typically the refrigerant is chosen so that its normal boiling point (that is, its boiling point at one atmosphere) is below the temperature of the mass to be cooled, so that the vapor pressure of the working fluid is above atmospheric; under these circumstances, leaks do not cause contaminants in the vicinity of the equipment to be drawn into the moving parts of the machinery. The vapor pressure of the working fluid (and hence the gas phase density) also influences the thermodynamic efficiency of the machinery.

In a conventional chilled water air conditioning system, for example, a working fluid is repetitively compressed and expanded as above; the reduced temperature expanded vapor is passed through a heat exchanger comprising a number of tubes containing water, chilling the water. The water is then pumped to areas requiring cooling, where warm air is blown over heat exchange surfaces in thermal relation with the chilled water, chilling the air. Such systems are more economical to operate than systems moving cold air a long distance from a chilling plant to a location to be cooled. Such chilled water refrigeration systems are in common use in buildings, and in ocean-going vessels and the like. A key characteristic of a refrigerant for a chilled water system is that its boiling point be just above 0° C., to avoid freeze-up of the water while obtaining efficient operation.

The majority of refrigerants utilized in vapor compression systems are either single component fluids or azeotropic mixtures. Single component fluids or azeotropic mixtures are characterized as constant boiling because they exhibit isothermal and isobaric evaporation and condensation. Azeotropic or, more generally, azeotrope-like compositions are desired refrigerants because they do not fractionate upon boiling or evaporation. This behavior is desirable because unless the refrigerant is constant-boiling, i.e., is azeotrope-like, fractionation and segregation will occur upon evaporation and condensation carried out in vapor compression equipment. Moreover, leakage from the machinery will cause the composition to shift, altering the properties of the working fluid.

The art is continually seeking new fluorocarbon-based azeotrope-like mixtures for refrigeration and heat pump applications. Environmentally acceptable fluorocarbon-based refrigerants are of particular interest as substitutes for fully halogenated chlorofluorocarbons (CFCs) which have been for many years the dominant refrigerants. CFCs are implicated in causing environmental problems associated with the depletion of the earth's protective ozone layer.

Any CFC substitute material must possess the useful properties of the CFC to be replaced, including chemical stability, low toxicity, non-flammability, and efficiency in use. The latter characteristic is important, for example, in refrigeration applications where a loss in refrigerant thermodynamic performance or energy efficiency may produce secondary environmental effects due to increased fossil fuel usage arising from an increased demand for electrical energy. Furthermore, an ideal CFC substitute refrigerant would not require major engineering changes to vapor compression technology currently used with CFC refrigerants. Thus, a CFC substitute must have boiling point, speed of sound, thermal conductivity and like characteristics similar to the CFC it is to replace.

The present invention concerns replacement of CFC refrigerant fluids used in water chillers specifically intended for marine application, that is, where the system may at some time be exposed to salt water. This factor presents an additional constraint on the selection of a refrigerant; specifically, one must take into account the possibility that at some point the components of the system may leak. If the vapor pressure of the working fluid is below atmospheric at the usual working temperature of the system, such a leak may cause water or water vapor in the vicinity of the leak to be drawn into the system. If salt water is drawn into a typical vapor compressor the compressor may be very badly damaged and possibly destroyed.

Refrigerant fluids for use in chilled water refrigeration units for marine application have been selected to have above-atmospheric vapor pressures at the usual working temperature, so that a leak does not tend to draw salt water into the components in contact with the working fluid. Specifically, a known refrigerant referred to in the industry as R114, that is, $CClF_2CClF_2$, has been widely used in water chillers for marine use. This compound is a fully halogenated chlorofluorocarbon (CFC). Such CFC's are rapidly being eliminated throughout industry due to their tendency to cause environmental damage, specifically to the ozone layer of the atmosphere. Therefore a need exists in the art for a replacement for R114, retaining its desirable physical properties, but avoiding chlorine or other halogens as constituents.

Fluoro-ethers, such as pentafluorodimethyl ether, are known as potentially useful refrigerants. See U.S. Pat. Nos. 3,362,180 and 3,922,228. In particular, bis-(difluoromethyl) ether, $CHF_2OCHF_2$, has been suggested for use as a refrigerant, either alone or in combination with other refrigerants. See U.S. Pat. No. 4,961,321 to O'Neill et al. However, no particular examples of suitable combinations are given. The O'Neill patent discloses that bis-(difluoromethyl)ether is physically similar to the R114 refrigerant used in marine water chilling systems.

U.S. Pat. No. 4,948,526 to Fellows et al discusses combinations of pentafluorodimethyl ether and monochlorodifluoromethane for use in heating and cooling applications, that is, as refrigerants for heat pumps.

U.S. Pat. No. 4,810,403 to Bivens et al discusses a variety of halocarbon blends for refrigerant use, specifically including FC-143 (also known in the art as R143), that is, $CHF_2CH_2F$, or 1,1,2-trifluoroethane. However, the combinations disclosed in the Bivens et al patent do not suggest combination of FC-143 or other halocarbons with ethers. Moreover, the data given by Bivens et al regarding FC-143 is not accurate, according to detailed measurements carried out by the present inventor; in general, FC-143 has not been well characterized in the literature and has not been the subject of detailed study.

U.S. Pat. No. 2,066,905 to Booth discusses halogenated methyl ethers generally for use as refrigerants.

U.S. Pat. No. 4,139,607 to Simons et al discusses fluorinated dimethyl ethers as aerosol propellants, including bis-(difluoromethyl)ether.

U.S. Pat. No. 4,041,148 also to Simons et al is generally similar.

Accordingly, it is an object of this invention to provide azeotrope-like compositions for use as CFC substitute refrigerants, avoiding the use of chlorinated fluorocarbons.

It is another object of the invention to provide an environmentally acceptable, chemically stable, non-flammable and energy efficient refrigerant suitable for use in water chillers, specifically marine water chillers.

Other objects and advantages of the invention will become apparent from the following description.

DETAILED DESCRIPTION OF THE INVENTION

In accordance with the present invention, it has been discovered that a mixture of a known halocarbon refrigerant composition referred to as FC-143 or R143, that is, $CHF_2CH_2F$, and also known as 1,1,2-trifluoroethane, and an ether, specifically $CHF_2OCHF_2$, that is, bis-(difluoromethyl) ether, sometimes referred to as E134, is an azeotropic refrigerant suitable for chilled water refrigeration plants which may safely be exposed to salt water in use.

The thermodynamic state of a fluid is defined by four variables: pressure, temperature, liquid composition, and vapor composition, or P-T-X-Y, respectively. An azeotrope is a system of two or more components where X and Y are equal at the stated P and T. In practice this means that the components of the mixture cannot be separated during a phase change, and therefore that the mixture is useful in cooling and heating applications for the reasons given above.

For the purposes of this discussion, the term "azeotrope-like" as applied to a composition is intended to mean that the composition behaves as a true azeotrope in terms of its constant boiling characteristics or tendency not to fractionate upon boiling or evaporation. Thus, in such systems, the composition of a vapor formed during evaporation is identical or substantially identical to the composition of the evaporant liquid. Hence, during boiling or evaporation, the liquid composition changes only slightly, if at all. This is to be contrasted with non-azeotrope-like compositions in which the liquid and vapor compositions change substantially during evaporation or condensation.

If the vapor and liquid phases have identical compositions, then it can be shown on a rigorous thermodynamic basis that the boiling point versus composition curve passes through an absolute maximum or an absolute minimum at this composition. More specifically, if one of two conditions, identical liquid and vapor compositions, or a minimum or maximum boiling point, is shown to exist, then the system is an azeotrope, and the other condition must follow.

Accordingly, one way to determine whether a candidate mixture is azeotrope-like within the meaning of this definition is to distill a sample thereof under conditions which would be expected to fractionate a non-azeotropic mixture into its separate components. That is, a candidate mixture is a non-azeotrope or is non-azeotrope-like if during temperature changes the mixture will fractionate, i.e. separate into its various components, with the component having the lowest boiling point distilling off first, and so on. If the mixture is azeotrope-like, the distillate will contain all of the components of the mixture at the same composition, so that the mixture will behave as a single substance. This phenomenon cannot occur if the mixture is not azeotrope-like, i.e. if it is not part of an azeotropic system.

As indicated, an equivalent method for determining whether a candidate mixture is azeotrope-like is to determine whether a curve graphing boiling point data versus the composition of a variety of mixtures in the system passes through a maximum or minimum. The composition of the system at the inflection point (that is, at the maximum or minimum in the boiling point verses composition curve) is termed the "true azeotrope" of the system. Azeotropes which possess a minimum boiling point must also possess a maximum in the vapor pressure curve at the same composition; these mixtures are termed positive azeotropes. Similarly, those azeotropes which show a maximum boiling point must exhibit a minimum in the vapor pressure curve and are termed negative azeotropes.

It follows from the above that if an azeotrope exists in a particular system, the system includes a range of azeotrope-like compositions, that is, compositions containing the same components in varying proportions, all of which are nearly azeotropic. All compositions within such a range are intended to be covered by the term "azeotrope-like" as used herein. For example, it is well known that at differing pressures, the composition of a given azeotrope will vary at least slightly as does the boiling point of the composition. Thus, an "azeotrope-like composition of A and B" represents a variable composition depending on the temperature and/or pressure.

Accordingly, "azeotrope-like" within the meaning of this invention includes mixtures all exhibiting vapor pressures within a stated small range of pressures at a temperature of interest, e.g. about ±3 psia (21 kPa) at 0° C., of the vapor pressure of the true azeotropic composition disclosed herein.

According to the present invention, it has been discovered by the inventor in analysis of an impure specimen of E134 that a mixture of E134, that is, $CHF_2OCHF_2$, or bis-(difluoromethyl)ether, including approximately four mol percent of R143, that is, $CHF_2CH_2F$, or 1,1,2-trifluoroethane, is azeotrope-like, having characteristics satisfactory for replacement of R114 as the working fluid in a chilled water refrigeration plant specifically intended for safe occasional exposure to sea water.

More specifically, accurate data obtained by the inventor and co-workers indicates that the boiling point of R143, i.e., 1,1,2-trifluoroethane is approximately 4° C., not 5° C. as reported in the literature and in U.S. Pat. No. 4,810,403 discussed above. The inventor has also found that the boiling point at one atmosphere of E134, or bis-(difluoromethyl) ether, is 4° C. The inventor has further discovered that the azeotrope-like mixture containing approximately 4 mol percent of R143 and 96 mol percent E134 has a boiling point at one atmosphere of approximately 5.27° C. This material is ideal for replacement of R114. Its boiling point is close to 0° C. so that relatively cold water can readily be obtained for efficient subsequent heat exchange with air, while running no risk of freeze-up. Moreover, the vapor pressure of this mixture is sufficiently high at normal temperatures that water will not tend to be drawn into any leaky equipment containing this working fluid. Furthermore, thus adding a relatively small quantity of R143 to E134 lowers the heat capacity of E134, reducing the risk of "wet compression", that is, avoiding the formation of small droplets of liquid in a compressor. Formation of such droplets is very damaging to the components of a compressor.

As indicated above, the composition of a particular azeotrope varies somewhat with the boiling point of the composition. Compositions of the present invention are considered azeotrope-like if azeotropic behavior over some small range of vapor pressures is exhibited. The fact that the boiling point of the 4 mol percent R143/96 mol percent E134 mixture is above the boiling point of either of the pure substances unequivocally indicates azeotropic behavior.

More specifically, vapor pressure measurements referred to above carried out by the inventor on a mixture of E134 including 4 mol percent R143, together with comparable measurements on pure E134 and R143, provide enough information to model the mixture completely. The modified hard sphere fluid model employed in the NIST Standard Reference Database 23 was used for this analysis. See National Bureau of Standards Technical Note 1226: Application of a Hard Sphere Equation of State to Refrigerants and Refrigerant Mixtures, Morrison et al, (1986). Using the measured vapor pressures of pure E134, pure R143, and the 4 mol percent R143, balance E134 mixture previously described, the model predicts that this system will have a true azeotrope at approximately 41 mole percent E134. The estimated vapor pressure of the azeotrope is 128 kPa at 279.44K, the normal boiling point of E134. The model further predicts that the normal boiling point of the mixture at one atmosphere will be approximately 273.67K.

Mixtures of between about 2 and about 98 mol percent of R143, balance E134, preferably between about 5 and about 80 mol percent of R143, balance E134, and still more preferably between about 50 and about 70 mol percent of R143, balance E134 are useful azeotrope-like compositions in accordance with the present invention. The mixture of 59 mol percent R143 and 41 mol percent E134 is the true azeotrope, that is, the composition of the system having the lowest boiling point.

In a process according to the invention, the azeotrope-like composition of the invention may be used in a method for cooling by condensing a refrigerant comprising the azeotrope-like composition and thereafter evaporating the refrigerant in heat-conducting relationship with a mass to be cooled, specifically, a quantity of water in a water chiller. It is within the skill of the art to replace the refrigerant R114 where now in use with the azeotrope-like mixture according to the present invention.

Inasmuch as the present invention is subject to many variations, modifications and changes in detail, it is intended that all subject matter discussed above be interpreted as illustrative only and not be taken in a limiting sense.

What is claimed is:

1. An azeotropic refrigerant for a chilled water refrigeration plant consisting essentially of approximately 59 mol percent 1,1,2-trifluoroethane, the balance bis-(difluoromethyl) ether, having a boiling point of approximately 273.67K at a pressure of one atmosphere.

2. A method for chilling water which comprises condensing the azeotrope-like refrigerant of claim 1 and evaporating said refrigerant in heat exchange relationship with water to be chilled.

* * * * *